Jan. 13, 1970　　S. A. VEARNALS ET AL　　3,489,427
VEHICLES

Filed July 28, 1967　　3 Sheets-Sheet 1

INVENTORS
Sydney Algar Vearnals
James Francis Lugsden
Ralph Redgate
By Sparrow and Sparrow
ATTORNEYS

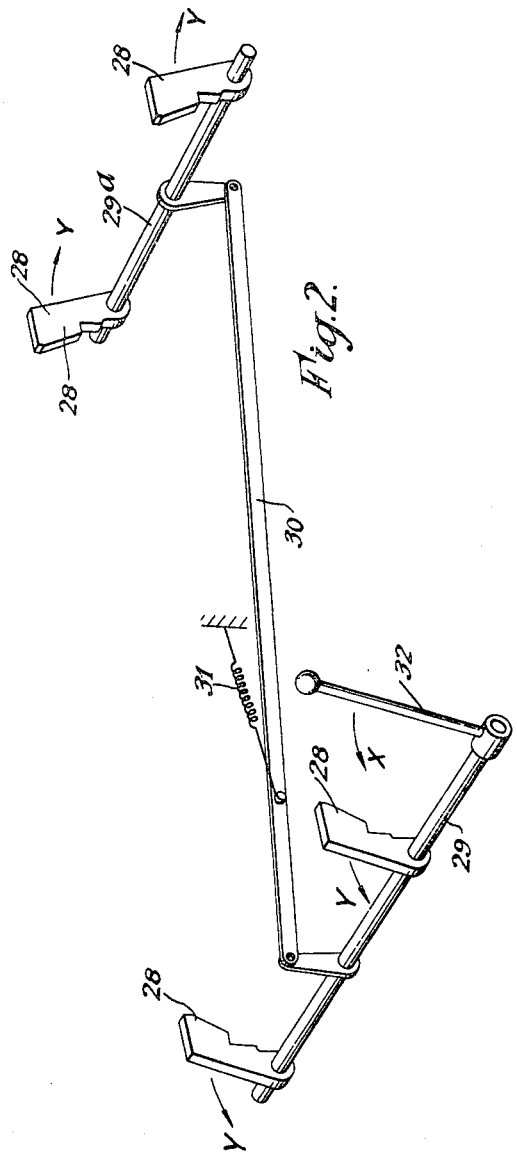

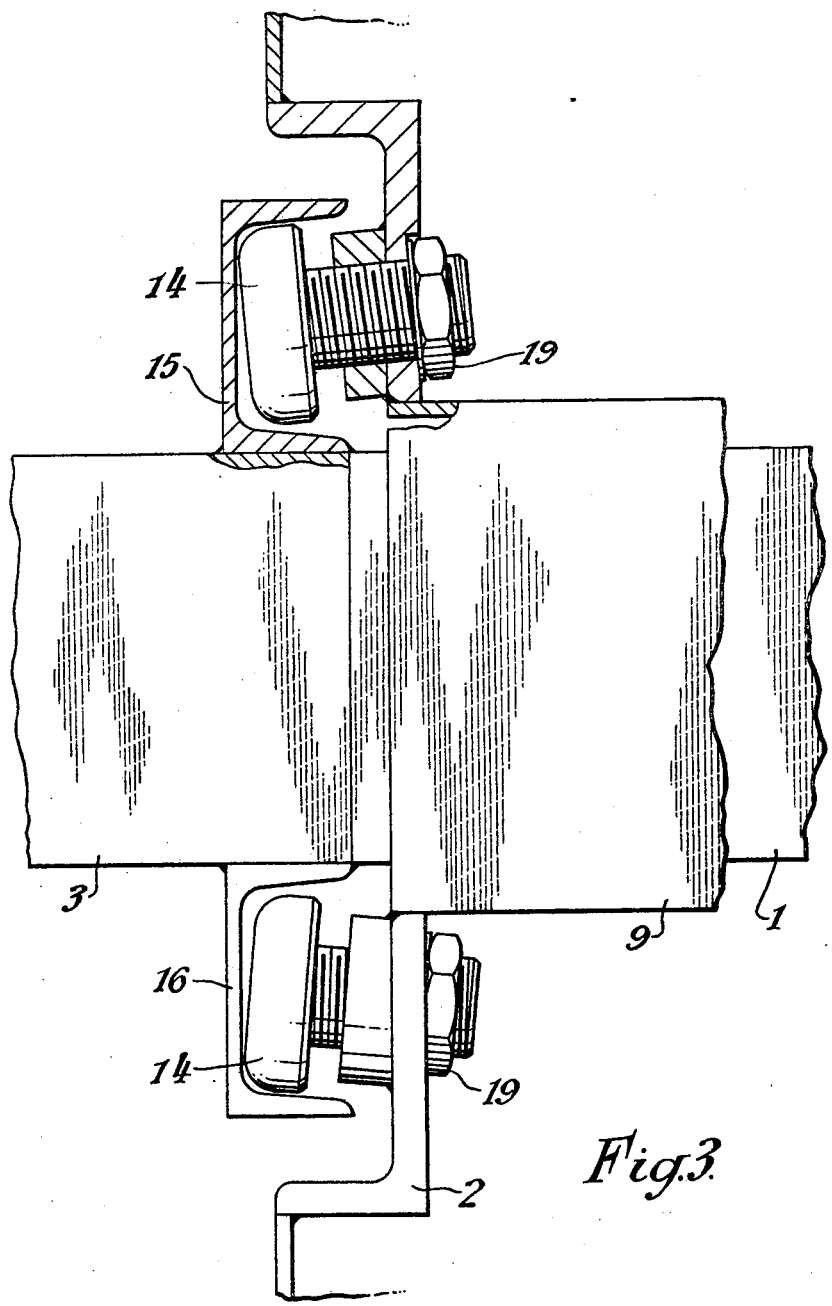

United States Patent Office 3,489,427
Patented Jan. 13, 1970

3,489,427
VEHICLES
Sydney A. Vearnals, Poole, Dorset, James F. Lugsden, West Moors, Dorset, and Ralph Redgate, Arnold, Nottingham, England, assignors to Wessex Industries (Poole) Limited, Poole, England
Filed July 28, 1967, Ser. No. 656,933
Claims priority, application Great Britain, Aug. 3, 1966, 34,823/66
Int. Cl. B62d 21/14; B60p 1/02
U.S. Cl. 280—43.23                                   8 Claims

ABSTRACT OF THE DISCLOSURE

A vehicle body construction including a vehicle body support member such as a central spine arranged to receive and to support at least a part of the actual body of the vehicle, and hydraulically actuated means for adjusting the level of the part or the whole of the vehicle body such that the body may be raised or lowered to any required height for loading or unloading purposes.

---

This invention relates to vehicles and in particular to vehicle body constructions and the invention is particularly applicable to a body construction for a goods vehicle trailer or the like.

It is obviously an advantage for the purpose of loading and unloading a vehicle, to provide a vertically movable platform such that goods stored in pallets or like containers in the vehicle can be lowered to ground level, or raised from ground level to the level of the floor of the vehicle body, for respectively unloading the goods from or loading the goods onto the vehicle. Heretofore, a vertically movable platform has been provided at the rear of the vehicle to allow pallets or like containers to be loaded or unloaded as required. A disadvantage of such a rearwardly located platform used heretofore, is that where a plurality of pallets or the like are located in random order on the vehicle, and where certain of the pallets are required to be unloaded therefrom, it becomes necessary to unload pallets additional to those required in order to obtain access to the required pallets. Such an arrangement is time-consuming and occurs frequently when a vehicle is required to unload a predetermined number of pallets at each of a plurality of different premises, such as warehouses, retail stores etc., at the same time picking up and loading onto the vehicle, empty pallets required to be returned to the station of origin. In such cases, the empty pallets are loaded on to the vehicle impeding access to pallets required to be unloaded at the next stopping point. Thus, at such next stopping point, unless suitable alternative provision has been made for the storage of the empty pallets it may be necessary to unload not only the loaded pallets impeding access to those required, but also to unload the empty pallets, in order to gain access to and unload the required pallets.

To avoid the loading and unloading disadvantages of prior arrangements, it is an object of the present invention to provide a vehicle body construction which allows pallets or like containers to be loaded on a vehicle in any required order and to be unloaded therefrom without removal therefrom of any pallets not required to be unloaded during a specific unloading operation.

A more specific object of the present invention is to provide a vehicle body construction such as a vehicle trailer which enables goods contained in pallets or like containers to be loaded and unloaded at the side of the vehicle and at a predetermined level.

Thus according to the present invention there is provided a vehicle body construction including a vehicle body support member arranged to receive and support at least a part of the actual body of the vehicle and having means for adjusting the level of said part of the vehicle body.

In a preferred embodiment of the invention there is provided a central vehicle body support member arranged to support the entire body portion of the vehicle and having retractable means located thereon for raising and lowering the entire body portion of the vehicle to any required level.

In such a preferred embodiment, the vehicle body comprises a plurality of individual compartments each arranged to receive at least one pallet or like container and each compartment being arranged such as to allow the pallets to be loaded on or unloaded from the sides of the vehicle at a predetermined level to which the vehicle body has been actuated by said retractable means.

A preferred construction of vehicle body construction will now be described by way of example only with particular reference to the accompanying drawings wherein:

FIGURE 2 is a perspective view of the vehicle body locking and release mechanism and FIGURE 3 is a sectional view showing the manner in which the vehicle body is slidably supported on the chassis by angled roller members.

Figure 1:
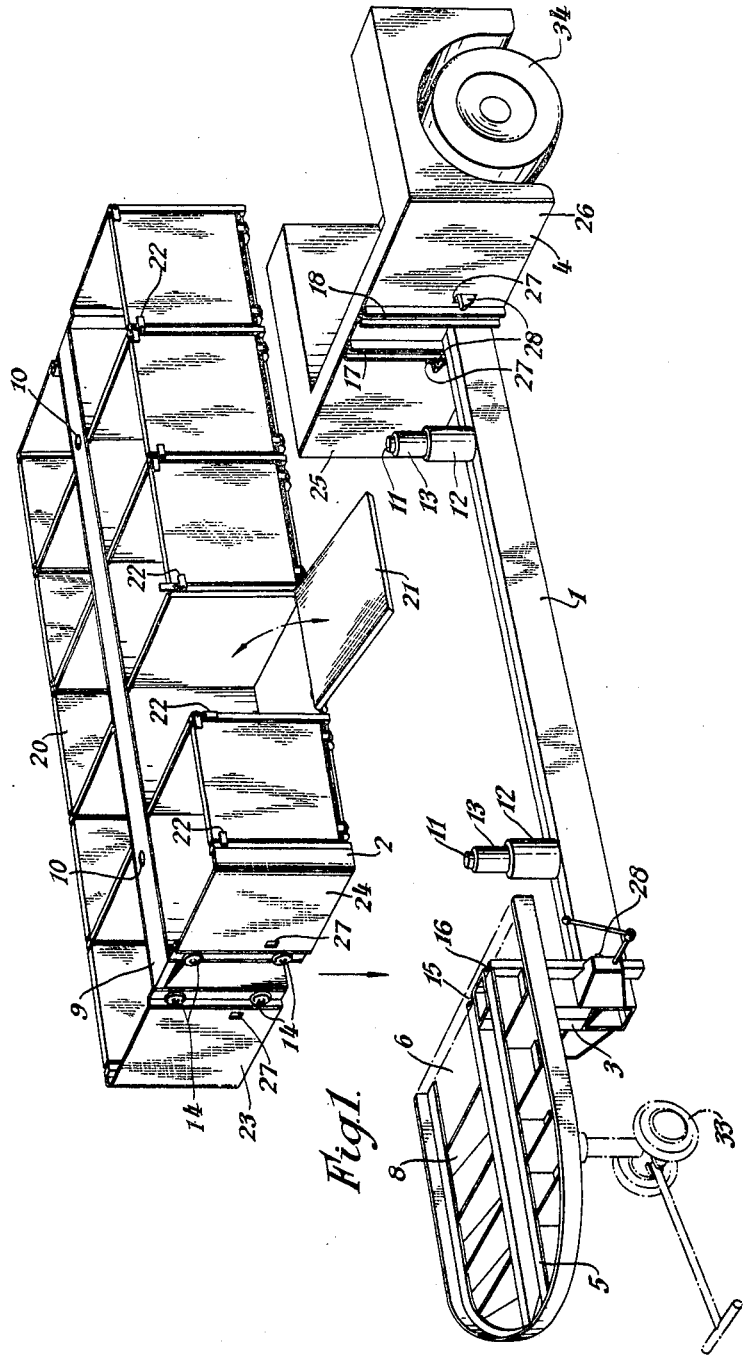
FIGURE 1 is a perspective exploded view of the vehicle body construction showing the trailer chassis and the compartmentalised vehicle body.

Referring to FIGURE 1, the vehicle trailer chassis includes a central spine 1 serving as a support for the vehicle body 2. The central spine 1 extends between an upstanding, vertical support member 3 and a vertical wall portion 4. A swan-necked extension 5 secured to the support member 3 supports a platform 6 which is divided into compartments by means of transverse members 8 as shown for a purpose hereinafter described.

The main body portion 2 comprises a central platform 9 having a pair of circular apertures 10 formed therein arranged to receive spigots 11 of a pair of retractable members 12 provided on the central spine 1 of the vehicle chassis. The retractable members 12 preferably comprise hydraulically-actuated pistons 13 such that the vehicle body 2 be raised or lowered to a predetermined required level for loading or unloading purposes as required.

The vehicle body 2 is slidably located on the chassis by means of rollers 14, located on the vehicle body 2 and angled as shown in FIGURE 3 and arranged to ride in channels 15, 16, 17, 18, provided on the support member 3 and wall portion 4 respectively of the trailer chassis. The position of each roller 14 in its respective channel is arranged to be adjustable by means of adjusting and securing means 19 (FIGURE 3).

As shown in FIGURE 1, the vehicle body is divided on both sides of the central platform 9, into individual compartments 20, each intended to receive one of a plurality of wheeled pallets or like containers. Each compartment 20 is provided with a hinged side member 21, one of which is shown in the open, lowered position. Each side member 21 is provided with releasable retaining means 22 and the arrangement is such that any side member 21 may be lowered to the position shown in FIGURE 1 to allow pallets and the like containers to be loaded and unloaded as required.

The end walls 23, 24, 25, 26, of the vehicle body 2 are each provided with an aperture 27 for the receipt of a locking pawl or lever 28 as will be hereinafter described such that the vehicle body 2 may be retained in position with respect to the vehicle chassis.

As shown in FIGURE 2, the locking and retaining mechanism includes a pair of bars 29, 29a, each having fixedly mounted thereon a pair of spaced locking pawls 28. An articulated link 30 couples the bars 29, 29a and the link is spring biassed as shown by means of a coil spring 31 connected to a fixed portion of the chassis. The locking mechanism link 30 is located within the central spine 1 and is arranged to be moved in the direction of the arrows X (FIGURE 2) by means of handle 32 to release the pawls 28 from engagement in apertures 27 in vehicle body 2; the pawls 28 moving in the direction of arrows Y as shown in FIGURE 2.

The arrangement is such that the vehicle body 2 can be raised or lowered by means of the hydraulic actuating means 12, such that for loading purposes, the vehicle body may be lowered to curb or ground level to allow wheeled pallets to be wheeled into the compartments 20 from the side of the vehicle. After a loading operation is completed, the vehicle body 2 may be raised until an unloading operation is required to be performed. The vehicle body is then again lowered to any required level and the pallets removed from any compartment 20 of the body 2. With such an arrangement, once the pallets have been loaded on the vehicle, no disturbance thereof takes place until the removal thereof from the vehicle in accordance with particular unloading requirements.

As shown in FIGURE 1, the trailer is provided with supporting wheels 33 and main wheels 34 and the compartmentalised platform 6 supported on the swan-neck extension 5 may also be used for the storage of goods, and the rear portion of the vehicle beyond the wall 4 may be used also for the storage of goods required to be loaded and unloaded from the rear of the vehicle.

While the invention has been described and illustrated with respect to a preferred embodiment which brings satisfactory results, it is susceptible of considerable modification and is not to be deemed limited to the particular constructional features described by way of example only.

We claim:

1. A vehicle body construction comprising body support means, said means comprising a central spine supporting a vehicle body portion and constituting a chassis, retractable means located on said body support means for raising and lowering said vehicle body to a desired level, a vertical support member at one end of said spine and a vertical wall member at the other end of said spine, a central platform on said vehicle body, said platform located above said spine substantially throughout the length thereof, and said retractable means comprising hydraulically acuatable members located on said spine beneath said central platform for raising and lowering selectively, said body portion, said respective vertical support and wall members serving to guide said body portion during its vertical movements.

2. A vehicle construction body comprising a body portion and a central body support member supporting at least a part of said vehicle body portion, means for adjusting the level of said part of said vehicle body portion, a chassis having a central spine supporting said vehicle body portion, a vertical support member at one end of said spine and a vertical wall member at the other end of said spine, a central platform on said vehicle body portion, said platform located above said spine, said means for adjusting said level of said vehicle body portion comprising hydraulically actuatable members located on said spine beneath said central platform for raising or lowering of said body portion selectively to any required height, and a pair of channels on both said vehicle support member and said vertical wall member, one of said channels located on either side of said spine, and sliding means at the ends of said vehicle body portion, said sliding means located within said channels for slidably locating of said body portion on said chassis.

3. A vehicle body construction according to claim 2 and said sliding means comprising angled rollers, said rollers riding in said channels on both said vertical support member and said vertical wall portion of said chassis.

4. A vehicle body construction comprising a body portion and a central body support member supporting at least a part of said vehicle body portion, means for adjusting the level of said part of said vehicle body portion, said support member comprising a central spine supporting substantially the entire portion of said vehicle body portion and having retractable means located thereon for raising and lowering said entire body portion of said vehicle to any required level, at least a part of said vehicle body portion comprising a plurality of individual compartments, each one of said compartments arranged to receive at least one pallet or like container, and means on each one of said compartments permitting said pallets or like containers to be loaded on or unloaded from the sides of said vehicle at a predetermined level to which said compartments have been positioned in response to actuation of said retractable level adjusting means, a chassis having a central spine supporting said vehicle body portion, a vertical support member at one end of said spine and a vertical wall member at the other end of said spine and a central platform on said vehicle body, said platform located above said spine of said chassis throughout the length thereof, and said means for adjusting said level of said vehicle body portion comprising hydraulically actuatable members located on said spine beneath said central platform for raising or lowering of said body portion to any required height, and a pair of channels on both said vertical support member and said vertical wall member, one of said channels located on either side of said spine, and sliding means at the ends of said vehicle body portion, said sliding means located within said channels for slidably locating of said body portion on said chassis.

5. A vehicle body construction comprising a body portion and a central body support member supporting at least a part of said vehicle body portion, means for adjusting the level of said part of said vehicle body portion, a chassis having a central spine supporting said vehicle body portion, a vertical support member and a vertical wall member at the ends of said spine, a central platform on said vehicle body portion, said platform located above said spine, said means for adjusting said level of said vehicle body portion comprising hydraulically actuatable members located on said spine beneath said central platform for raising and lowering of said body portion selectively to any required height, said central platform having a pair of apertures, spigot members on said actuable members, said spigot members fitting into said apertures, each of said actuatable members comprising a piston, and a pair of channels on both said vertical support member and on said vertical wall member, one of said channels located on either side of said spine, said sliding means at the ends of said vehicle body portion, said sliding means located within said channels for slidably locating of said body portion on said chassis.

6. A vehicle body according to claim 5, and said sliding means comprising angled rollers, said rollers riding in said channels on both said vertical support member and said vertical wall portion of said chassis.

7. A vehicle body construction comprising a vehicle body support member constituting a central spine for supporting substantially the entire body portion of said vehicle, retractable means located on said member for raising and lowering substantially the entire body portion of said vehicle to a required level, at least a part of said vehicle body comprising a plurality of individual compartments, each one of said compartments arranged to receive at least one pallet or like container, means on each of said compartments for loading and unloading said pallets from the sides of the vehicle at a predetermined level to which said compartments have been positioned in response to actuation of said retractable means, a vertical support member located at one end of said spine and a vertical wall member located at the other end of said spine both said vertical support and said wall members supporting said spine, said respective support and wall members serving to guide said vehicle body during its vertical movement, and a central platform on said vehicle body, said platform located above said spine throughout the length thereof.

8. A vehicle body construction according to claim 7, said retractable means comprising hydraulically actuable members on said spine beneath said central platform.

References Cited
UNITED STATES PATENTS

| | | | |
|---|---|---|---|
| 2,820,667 | 1/1958 | Benaroya | 296—24 |
| 2,940,769 | 1/1960 | Taylor | 280—43.23 |

LEO FRIAGLIA, Primary Examiner

R. L. SONG, Assistant Examiner

U.S. Cl. X.R.

214—512; 280—423